United States Patent
Hsieh

(10) Patent No.: US 7,268,497 B2
(45) Date of Patent: Sep. 11, 2007

(54) LIGHTING DEVICE WITH NIGHT LIGHT AND HUMAN BODY SENSING CAPABILITY

(76) Inventor: Chin-Mu Hsieh, No. 5, Lane 93, Gong Yuan Rd., Yong Kang City, Tainan Hsien (TW)

(*) Notice: Subject to any disclaimer, the term of this patent is extended or adjusted under 35 U.S.C. 154(b) by 0 days.

(21) Appl. No.: 11/281,452

(22) Filed: Nov. 18, 2005

(65) Prior Publication Data

US 2007/0114947 A1    May 24, 2007

(51) Int. Cl.
    *H01J 1/60* (2006.01)
(52) U.S. Cl. .................. 315/134; 315/82; 315/134; 315/308; 315/130; 340/693.11; 340/541
(58) Field of Classification Search ............ 315/134, 315/308, 130, 136, 307, 133, 360; 340/451, 340/573.1, 693.11
    See application file for complete search history.

(56) References Cited

U.S. PATENT DOCUMENTS 5,442,177 A * 8/1995 Boulos et al. .............. 250/342
6,909,239 B2 * 6/2005 Gauna ........................ 315/134
7,122,976 B1 * 10/2006 Null et al. .................. 315/362
2005/0259416 A1 * 11/2005 Gauna et al. ............... 362/227

* cited by examiner

*Primary Examiner*—Douglas W. Owens
*Assistant Examiner*—Chuc Tran
(74) *Attorney, Agent, or Firm*—Rosenberg, Klein & Lee

(57) ABSTRACT

A lighting device with night light and human body sensing capability includes a first illumination device, a second illumination device, a sensor and a main body. The first illumination device is designed to illuminate a local predetermined area, and the second illumination device is designed to illuminate an entire predetermined area. The sensor comprises a first sensing member and a second sensing member. The first sensing member is to detect the illumination status of the predetermined area and to activate the first illumination device. The second sensing member is to detect a human body approaching and to activate the second illumination device. The main body is provided with fixtures to dismantle a cover for replacing the second illumination device.

1 Claim, 4 Drawing Sheets

LIGHTING DEVICE WITH NIGHT LIGHT AND HUMAN BODY SENSING CAPABILITY

BACKGROUND OF THE INVENTION

1. Field of the Invention

The present invention relates to a lighting device with night light and human body sensing capability, in particular to a lighting device able to illuminate a predetermined area in the dark or when sensing a human body approaching.

2. Description of the Prior Art

A conventional night light uses a sensor to detect the illumination of a certain predetermined area. When the area is getting dark, the light turns on itself.

A human sensor light will activate the light when sensing a human is approaching.

Some conventional advanced night lights may have both functions to activate the light. Some of them only turn on when the circumstance is getting dark. But most of the night lights are remained on for people to follow the trace to a switch which controls the regular lighting device.

None of the above-mentioned lighting devices can satisfy a night light requirement nor do they in compliance with energy saver.

SUMMARY OF THE INVENTION

The primary advantage of the invention is to provide a lighting device with night light and human body sensing capability, which is able to illuminate a local predetermined area in the dark and to illuminate an entire predetermined area when sensing a human body approaching.

According to an aspect of the invention, there is provided a lighting device with night light and human body sensing capability comprising a first illumination device, a second illumination device, a sensor and a main body; said first illumination device being to illuminate a local predetermined area; said second illumination device being to illuminate an entire predetermined area; said sensor comprising a first sensing member and a second sensing member, said first sensing member being adapted to detect the illumination status of the predetermined area and to activate said first illumination device, said second sensing member being adapted to detect a human body approaching and to activate said second illumination device; said main body accommodating said first illumination device, said second illumination device, and said sensor;

the invention further comprising a cover, said main body further comprising a socket, said socket being provided with fixtures, said cover being disposed on said socket, by screwing said fixtures to secure said cover on said socket of said main body;

each of said fixtures comprising a pivot and a claw, said pivot being pivotally connected to said socket with one end protruding outward of said socket and another end located within said socket of said main body to be fixedly connected with said claw.

It is another advantage of the present invention to provide a lighting device with night light and human body sensing capability, which is an energy saver.

DETAILED DESCRIPTION OF THE PREFERRED EMBODIMENT

Figure 1:
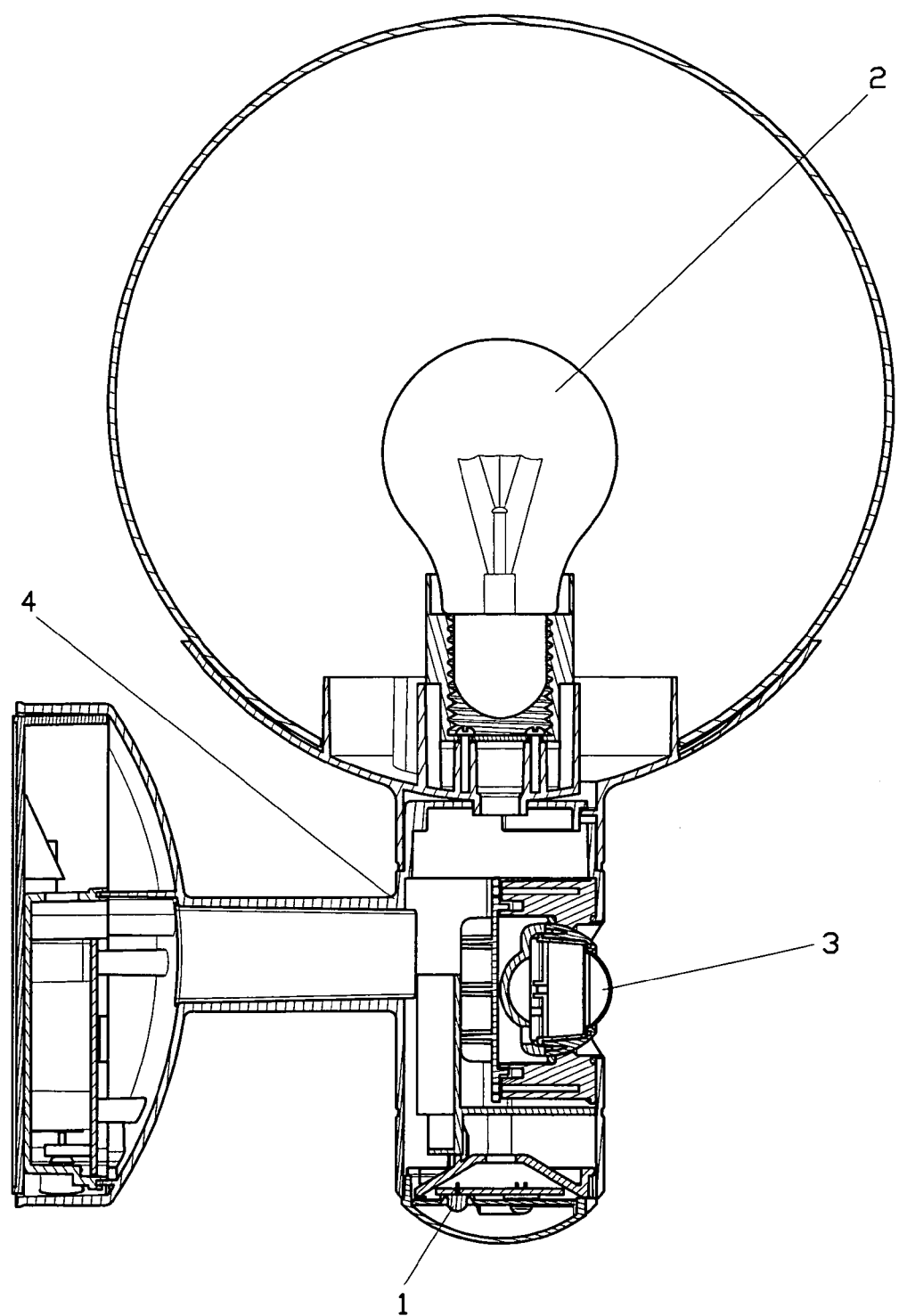
FIG. 1 is a side cross-sectional view of the present invention.

As shown in FIG. 1, the present invention comprises a first illumination device 1, a second illumination device 2, a sensor 3 and a main body 4.

The first illumination device 1 is to illuminate a local predetermined area. The second illumination device 2 is to illuminate an entire predetermined area.

The sensor 3 comprises a first sensing member 31 and a second sensing member 32. The first sensing member 31 is adapted to detect the illumination status of the predetermined area and to activate the first illumination device 1. The second sensing member 32 is to detect a human body approaching and to activate the second illumination device 2.

The main body 4 is adapted to secure the first illumination device 1, the second illumination device 2, and the sensor 3 therein.

The first illumination device 1 is a light emitting diode. The first sensing member 31 is a photoresistor.

The second illumination device 2 is a bulb. The second sensing member 32 is a far-infrared ray detector.

Figure 2:
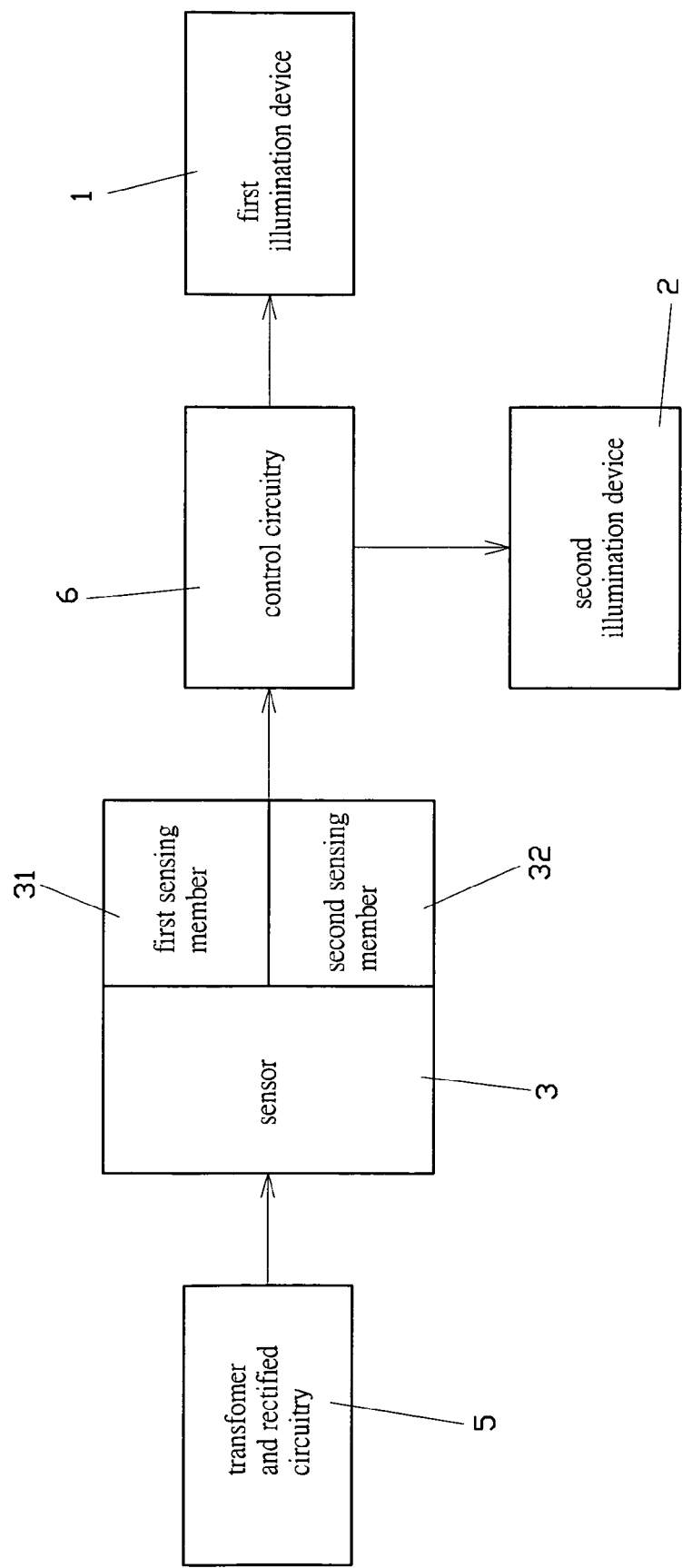
FIG. 2 is a circuit diagram of the present invention.

As shown in FIG. 2, a circuit diagram of the present invention includes a transformer and a rectified circuitry 5, the sensor 3, a control circuitry 6, the first illumination device 1, and the second illumination device 2. The sensor 3 includes the first sensing member 31 and the second sensing member 32. The control circuitry 6 is functioned as a signal amplifier, comparison, timer and control. When the first sensing member 31 (photoresistor) detects that the illumination of the predetermined area is changing to become dark and is under the standard of a predetermined value, it activates the first illumination device 1 (light emitting diode) to light the local predetermined area. This design is generally designed as guidance for a user to follow the light to find a particular area. When the second sensing member 32 (far-infrared ray detector) senses the approach of a human body, it immediately activates the second illumination device 2.

Figure 3:
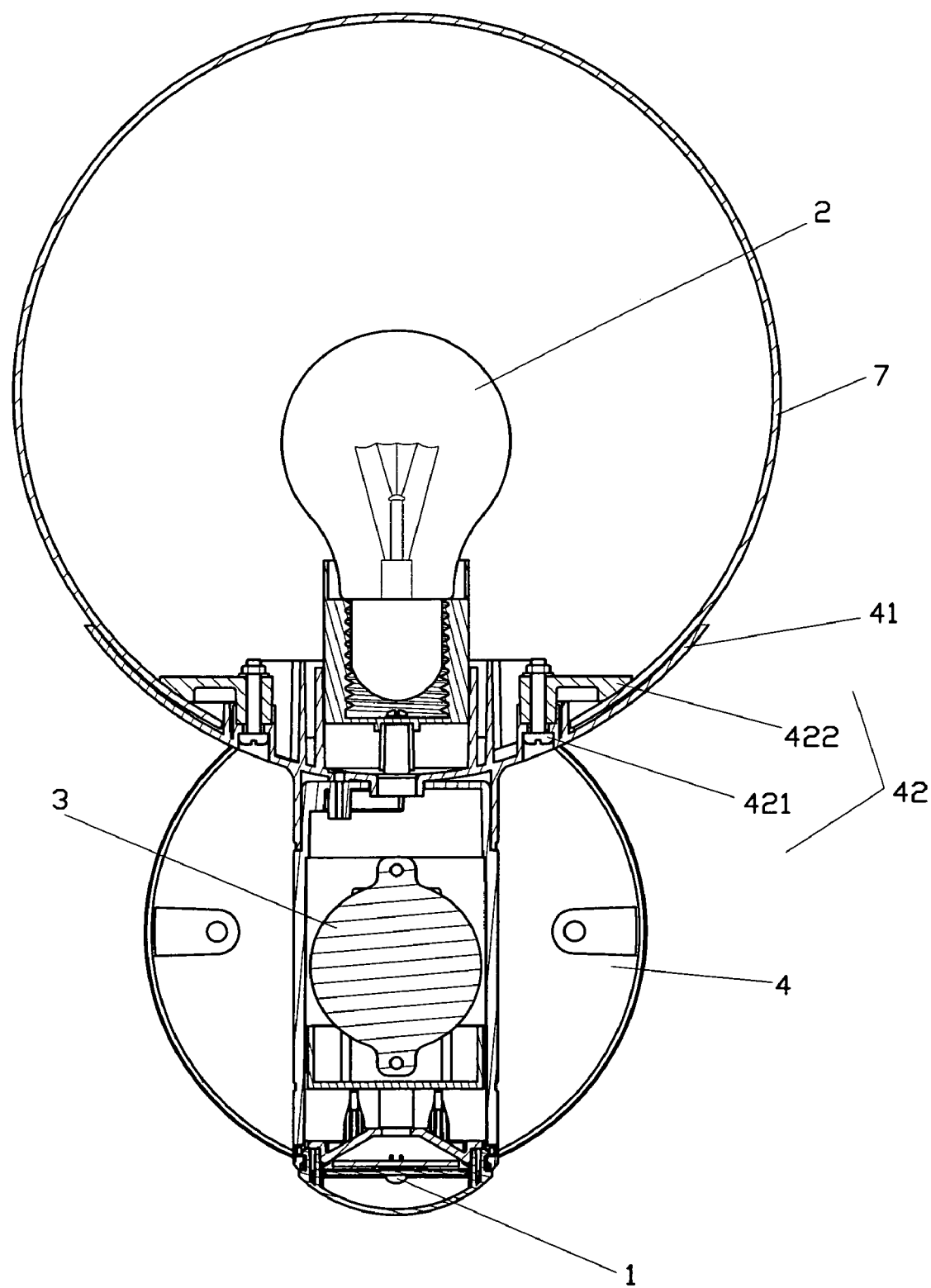
FIG. 3 is a side cross-sectional view of the present invention incorporated with a cover and fixtures.
Figure 4:
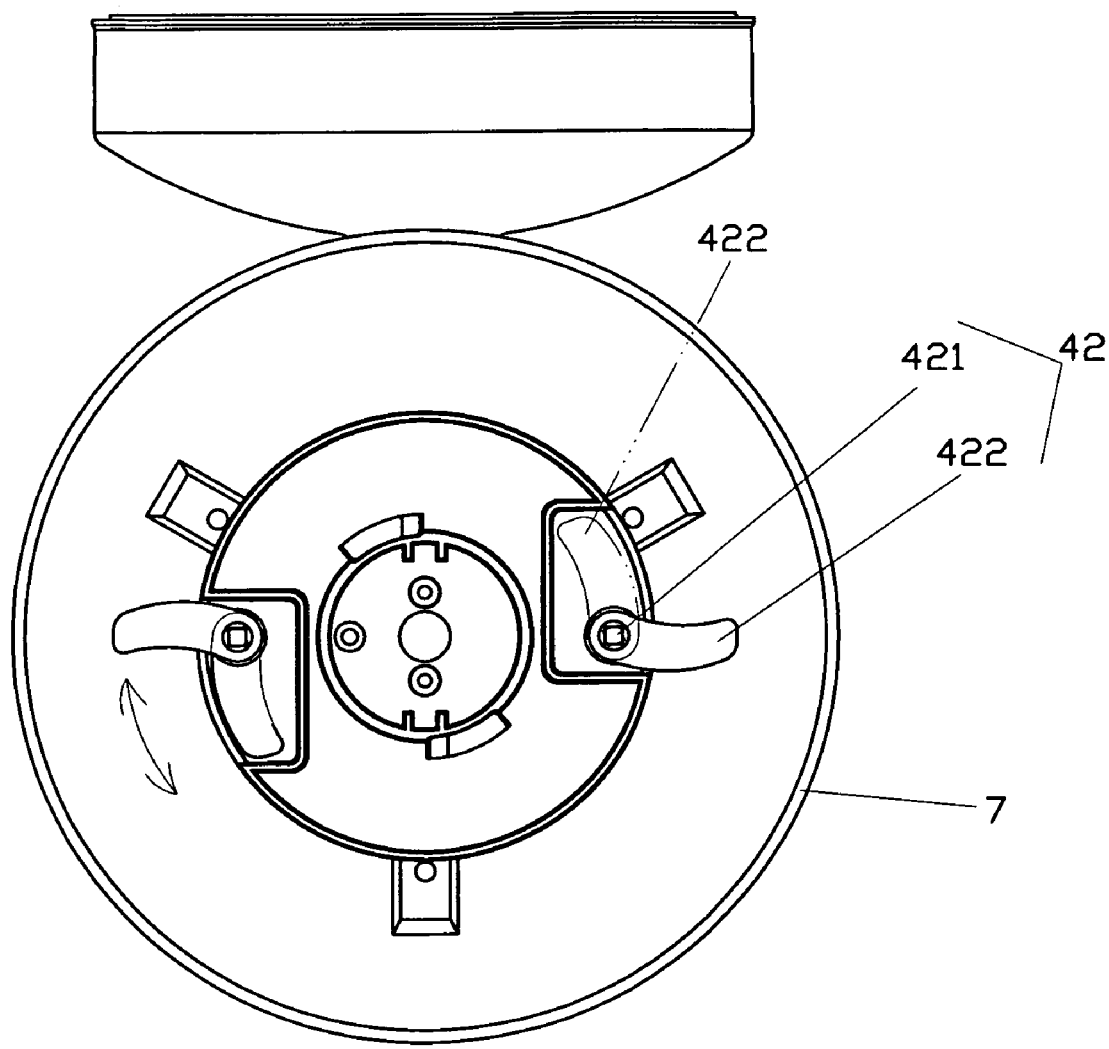
FIG. 4 is a top view of the present invention.

As shown in FIGS. 3 and 4, the present invention further comprises a cover 7. The main body 4 further includes a socket 41. The socket 41 is provided with fixtures 42. The cover 7 is disposed on the socket 41. By screwing the fixtures 42, the cover 7 is secured to the socket 41. Each fixture 42 includes a pivot 421 (in the drawings, a bolt is applied.) and a claw 422. The pivot 421 is pivotally connected to the socket 41 with one end protruding outward of the socket 41 and another end located within the socket 41 of the main body 4 to fixedly connect with the claw 422.

By screwing the pivot 421 clockwise, the claw 422 tightens the cover 7 to be secured on the socket 41. When the pivot 421 is screwed counterclockwise, the claw 422 will disengage from the inner side of the cover 7. The cover 7 may be detached for replacing the second illumination device 2.

What is claimed is:

1. A lighting device with night light and human body sensing capability comprising a first illumination device, a second illumination device, a sensor, a cover, and a main body;

said first illumination device being to illuminate a local predetermined area;

said second illumination device being to illuminate an entire predetermined area;

said sensor comprising a first sensing member and a second sensing member, said first sensing member being adapted to detect the illumination status of the predetermined area and to activate said first illumination device, said second sensing member being adapted to detect a human body approaching and to activate said second illumination device;

said main body accommodating said first illumination device, said second illumination device, and said sensor said main body including a socket, said socket being provided with fixtures;

said cover being disposed on said socket and secured by screwing said fixtures on said socket of said main body, each of said fixtures including a pivot and a claw, said pivot being pivotally connected to said socket with one end protruding outward of said socket and another end located within said socket of said main body to be fixedly connected with said claw.

* * * * *